(12) United States Patent
Tang et al.

(10) Patent No.: US 9,930,616 B2
(45) Date of Patent: Mar. 27, 2018

(54) DISTRIBUTED BASE STATION AND COMMUNICATIONS SYSTEM

(71) Applicant: Huawei Technologies Co., Ltd., Shenzhen, Guangdong (CN)

(72) Inventors: Zhanli Tang, Shanghai (CN); Fumin Chen, Shanghai (CN); Shan Tu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/448,810

(22) Filed: Mar. 3, 2017

(65) Prior Publication Data

US 2017/0181080 A1 Jun. 22, 2017

Related U.S. Application Data

(63) Continuation of application No. PCT/CN2015/087638, filed on Aug. 20, 2015.

(30) Foreign Application Priority Data

Sep. 4, 2014 (CN) .......................... 2014 1 0448565

(51) Int. Cl.
*H04W 52/02* (2009.01)
*H04W 88/08* (2009.01)

(52) U.S. Cl.
CPC ...... *H04W 52/0206* (2013.01); *H04W 88/085* (2013.01)

(58) Field of Classification Search
CPC .................. H04W 52/0206; H04W 88/085
See application file for complete search history.

(56) References Cited

U.S. PATENT DOCUMENTS 9,813,113 B2 * 11/2017 Fang ..................... H04B 3/54
2013/0077966 A1 3/2013 Gelbman et al.

FOREIGN PATENT DOCUMENTS

| CN | 102439835 A | 5/2012 |
|----|-------------|--------|
| CN | 102457944 A | 5/2012 |
| CN | 103650600 A | 3/2014 |
| EP | 1455512 A1 | 9/2004 |
| EP | 1947873 A1 | 7/2006 |
| EP | 1763179 A1 | 3/2007 |
| EP | 2645513 A1 | 10/2013 |
| EP | 3021638 A1 | 5/2016 |
| WO | 2012055208 A1 | 5/2012 |

* cited by examiner

*Primary Examiner* — Tuan H Nguyen

(57) ABSTRACT

A distributed base station, including a power system, a power supply apparatus, and at least two radio remote units RRUs, where one end of the power supply apparatus is connected to the power system and the other end is connected to the at least two RRUs; and the power supply apparatus is configured to receive power output by the power system and provide the power for the at least two RRUs, where a distance between any one RRU connected to the power supply apparatus and the power supply apparatus is less than a distance between the RRU and the external power system. In addition, the present invention further provides a communications system.

14 Claims, 7 Drawing Sheets

DISTRIBUTED BASE STATION AND COMMUNICATIONS SYSTEM

CROSS-REFERENCE TO RELATED APPLICATIONS

This application is a continuation of International Application No. PCT/CN2015/087638 filed on Aug. 20, 2015, which claims priority to Chinese patent application number 201410448565.6 filed on Sep. 4, 2014. The disclosures of the aforementioned applications are hereby incorporated by reference in their entireties.

TECHNICAL FIELD

The present invention relates to the field of communications technologies, and more specifically, to a distributed base station and a communications system.

BACKGROUND

Wireless communications base stations include a distributed base station. The distributed base station includes a baseband unit (BBU), an radio remote unit (RRU), and an antenna. When a network is actually built, power supplied to a radio remote unit is a direct current provided by a remote power system. As shown in FIG. 1, a radio remote unit is connected to a remote power system by using a direct current power cable. Generally, the remote power system is 40 to 100 meters, or even farther away from the radio remote unit.

During building of a wireless communications network, after a distributed base station is deployed in an initial phase, radio remote units are gradually added in the next few years to increase a capacity of the base station. Therefore, when the radio remote units are added, direct current power cables connected to the radio remote units also need to be added. As shown in FIG. 2, if a quantity of radio remote units on a distributed base station is increased from originally 3 to 6, three direct current power cables need to be synchronously added.

However, it is well known that a laying length of a direct current power cable is about 40 to 100 meters, or even longer, and laying direct current power cables requires relatively high engineering costs and a long construction period. In addition, because a direct current power cable is located outdoors, the entire direct current power cable needs to be protected, and costs are high. Therefore, when a capacity of a base station is expanded by adding radio remote units, direct current power cables connected to the radio remote units need to be synchronously added. In this case, engineering costs of laying direct current power cables and costs for late-stage protection need to be increased.

SUMMARY

For the foregoing problems, the present invention provides a distributed base station and a communications system, to resolve prior-art problems of high engineering costs and high protection costs resulting from synchronous addition of direct current power cables connected to radio remote units whenever radio remote units are added. Technical solutions are as follows:

According to a first aspect, an embodiment of the present invention provides a distributed base station, including a power system and at least two radio remote units RRUs, where the two RRUs include a first RRU and a second RRU; and further including a power supply apparatus, where a first end of the power supply apparatus is connected to the power system, a second end of the power supply apparatus is connected to the first RRU and the second RRU, and the power supply apparatus is configured to receive power output by the power system and provide the power for the first RRU and the second RRU, where a distance between the first RRU and the power supply apparatus is less than a distance between the first RRU and the power system, and a distance between the second RRU and the power supply apparatus is less than a distance between the second RRU and the power system.

With reference to the first aspect, in a first implementation manner of the first aspect, the first RRU, the second RRU, and the power supply apparatus are all disposed on a first tower.

With reference to the first implementation manner of the first aspect, in a second implementation manner of the first aspect, the first RRU is in contact with the second RRU, and the first RRU is in contact with the power supply apparatus; or the second RRU is in contact with the first RRU, and the second RRU is in contact with the power supply apparatus; or the power supply apparatus is in contact with the first RRU, or the power supply apparatus is in contact with the second RRU.

With reference to the first implementation manner of the first aspect or the second implementation manner of the first aspect, in a third implementation manner of the first aspect, another electrical equipment is further disposed on the first tower, the second end of the power supply apparatus is connected to the another electrical equipment, and the power supply apparatus is configured to provide power for the another electrical equipment.

With reference to any one of the first implementation manner of the first aspect to the third implementation manner of the first aspect, in a fourth implementation manner of the first aspect, a second tower is further included, where a third RRU is disposed on the second tower, the second end of the power supply apparatus is connected to the third RRU, and the power supply apparatus is configured to provide power for the third RRU, where a distance between the third RRU and the power supply apparatus is less than a distance between the third RRU and the power system.

With reference to the first aspect or any one of the first implementation manner of the first aspect to the fourth implementation manner of the first aspect, in a fifth implementation manner of the first aspect, a baseband unit BBU is further included, where the power system is further configured to output power to the BBU.

With reference to the first aspect or any one of the first implementation manner of the first aspect to the fifth implementation manner of the first aspect, in a sixth implementation manner of the first aspect, the power supply apparatus includes a direct current output unit, a control circuit, and a battery group, where an input end of the direct current output unit is connected to the power system, a positive output end of the direct current output unit is connected to positive input ends of the at least two RRUs, a negative output end of the direct current output unit is connected to negative input ends of the at least two RRUs, and the direct current output unit is configured to receive a voltage output by the power system, convert the voltage to a direct current voltage, and output the direct current voltage to the at least two RRUs;

a positive end of the battery group is connected to the positive input ends of the at least two RRUs, and a negative end of the battery group is connected to the negative input ends of the at least two RRUs;

a first end of the control circuit is connected to a control end of the direct current output unit, a second end of the control circuit is connected to control ends of the at least two RRUs, and a third end of the control circuit is connected to a control end of the battery group; and the control circuit is configured to: when an output power of the direct current output unit is equal to or greater than a power required by the at least two RRUs, control the direct current output unit to output power to the at least two RRUs, and only when the output power of the direct current output unit is greater than the power required by the at least two RRUs, control the direct current output unit to charge the battery group; and when the output power of the direct current output unit is less than the power required by the at least two RRUs, control the direct current output unit and the battery group to jointly output power to the at least two RRUs.

According to a second aspect, an embodiment of the present invention provides a communications system, including an external power supply and the distributed base station according to any one of the implementation manners of the first aspect, where the external power supply is configured to supply power to the distributed base station.

According to the foregoing technical solutions, the present invention provides a distributed base station, including a power system and at least two radio remote units RRUs, where the two RRUs may be a first RRU and a second RRU; and further including a power supply apparatus, where a first end of the power supply apparatus is connected to the power system, and a second end of the power supply apparatus is connected to the first RRU and the second RRU; and the power supply apparatus is configured to receive power output by the power system and provide the power to the first RRU and the second RRU, where a distance between the first RRU and the power supply apparatus is less than a distance between the first RRU and the power system, and a distance between the second RRU and the power supply apparatus is less than a distance between the second RRU and the power system. Therefore, an RRU in the present invention is not directly connected to the power system, but is indirectly connected to the power system by using the power supply apparatus. In addition, when the RRU is connected to the power system by using the power supply apparatus, it is ensured that a distance between the RRU and the power supply apparatus is less than a distance between the RRU and the power system. Therefore, during capacity expansion of the base station, a newly added RRU only needs to be connected to the power supply apparatus, and a new direct current power cable does not need to be added between the power system and the power supply apparatus. In addition, a distance between the newly added RRU and the power supply apparatus is less than a distance between the RRU and the power system. Compared with the technical solution in the prior art that a direct current power cable must be synchronously added when an RRU is added, the present invention reduces a length of a direct current power cable and reduces engineering costs and late-stage protection costs during laying of direct current power cables.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A technical core point of the present invention is to prevent an RRU from being directly connected to a power system by using a direct current power cable, but to implement an indirect connection between the RRU and the power system by using a power supply apparatus, where a distance between the RRU and the power supply apparatus is less than a distance between the RRU and the power system. During capacity expansion of a base station, a newly added RRU only needs to be connected to a power supply apparatus in the present invention, and a new direct current power cable does not need to be added between a power system and the power supply apparatus provided by the present invention. In addition, a length of the newly added direct current power cable between the RRU and the power supply apparatus is less than a length of a direct current power cable used for directly connecting the RRU and the power system in the prior art. Therefore, the present invention reduces a length of a direct current power cable and reduces engineering costs and late-stage protection costs during laying of direct current power cables.

Embodiment 1

Figure 1:
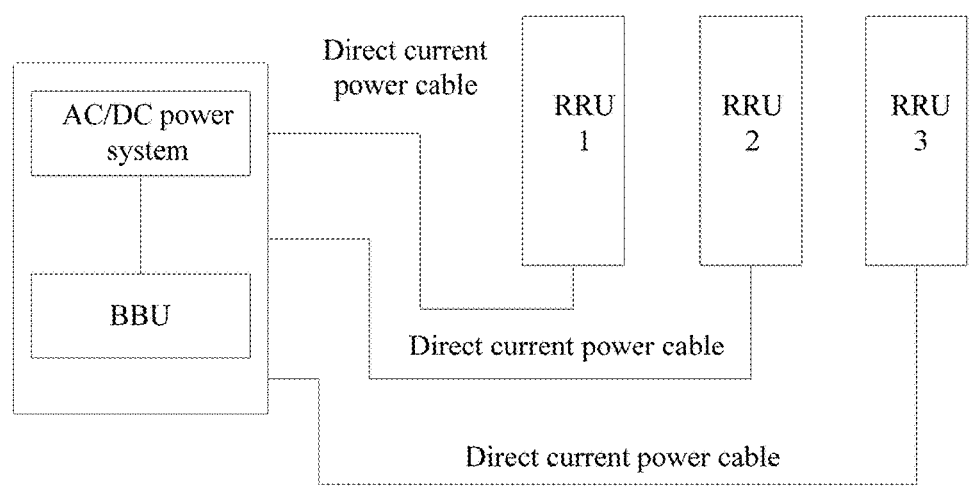
FIG. 1 is a schematic structural diagram of a distributed base station in the prior art.
Figure 2:
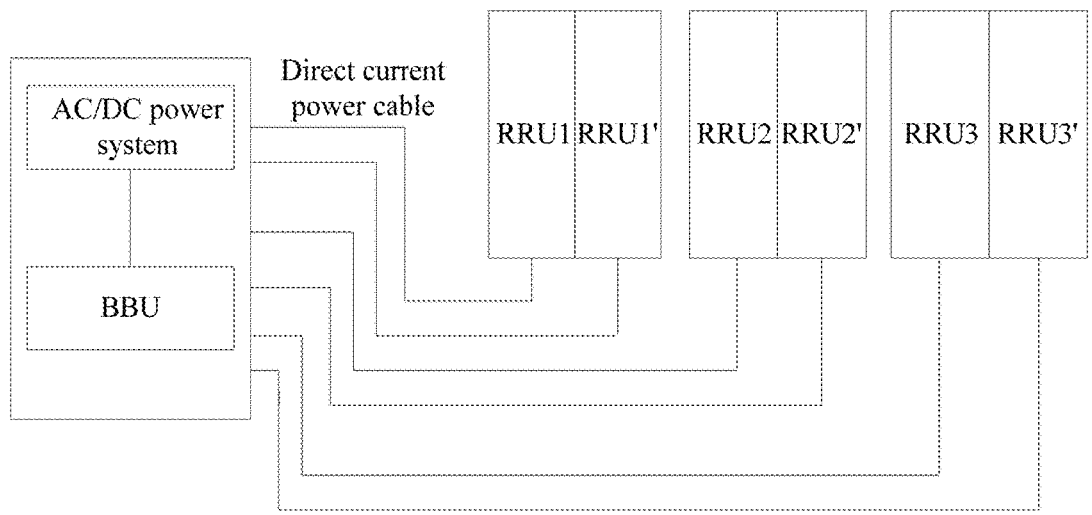
FIG. 2 is another schematic structural diagram of a distributed base station in the prior art.
Figure 3:
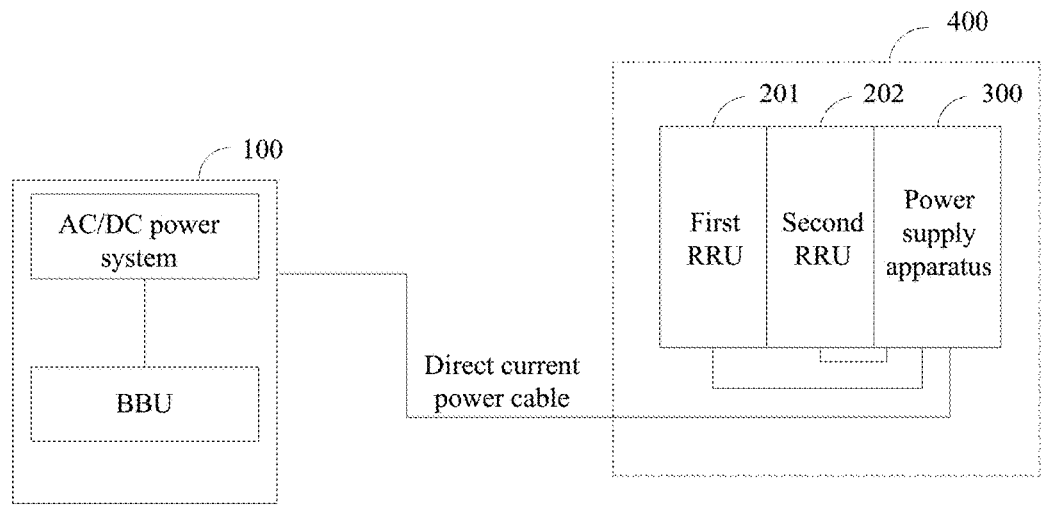
FIG. 3 is a schematic structural diagram of a distributed base station provided by the present invention.

Referring to FIG. 3, FIG. 3 shows a schematic structural diagram of a distributed base station provided by the present invention, including a power system 100 and at least two RRUs 200, where the two RRUs may include a first RRU 201 and a second RRU 202; and further including a power supply apparatus 300.

A first end of the power supply apparatus 300 is connected to the power system 100, a second end of the power supply apparatus 300 is connected to the first RRU 201 and the second RRU 202, and the power supply apparatus 300 is configured to receive power output by the power system 100 and provide the power to the first RRU 201 and the second RRU 202.

A distance between the first RRU 201 and the power supply apparatus 300 is less than a distance between the first RRU 201 and the power system 100, and a distance between the second RRU 202 and the power supply apparatus 300 is less than a distance between the second RRU 202 and the power system 100.

In an actual application, a distributed base station may include multiple towers. Multiple RRUs are disposed on each tower. In this embodiment, the first RRU 201, the second RRU 202, and the power supply apparatus 300 are all disposed on a first tower 400. Certainly, the power supply apparatus 300 in the present invention may not be disposed on the first tower 400, and may be installed near disposing locations of the first RRU and the second RRU, but a disposing location of the power supply apparatus 300 needs to meet that a distance between an RRU and the power supply apparatus 300 is less than a distance between the RRU and the power system 100.

It should be understood that the first RRU 201, the second RRU 202, and the power supply apparatus 300 may be all disposed on a roof or mounted on a wall. It should be noted that, regardless of whether the first RRU 201, the second RRU 202, and the power supply apparatus 300 are disposed on a tower or roof or mounted on a wall, a shorter distance between the first RRU 201 and the power supply apparatus 300 indicates a longer direct current power cable length that can be reduced; in addition, a shorter distance between the second RRU 202 and the power supply apparatus 300 indicates a longer direct current power cable length that can be reduced. Preferably, in this embodiment of the present invention, any two of the first RRU 201, the second RRU 202, and the power supply apparatus 300 are in contact; that is, any two of the first RRU 201, the second RRU 202, and the power supply apparatus 300 are seamlessly installed.

Further, in this embodiment of the present invention, the first RRU 201 is in contact with the second RRU 202, and the first RRU 201 is in contact with the power supply apparatus 300; or, the second RRU 202 is in contact with the first RRU 201, and the second RRU 202 is in contact with the power supply apparatus 300; or, the power supply apparatus 300 is in contact with the first RRU 201, and the power supply apparatus 300 is in contact with the second RRU 202.

It should be noted that, a structural relationship among the first RRU 201, the second RRU 202, and the power supply apparatus 300 can be side-by-side disposing or cascading disposing, and the three components are seamlessly installed between each other. Certainly, it may also be that after any two of the first RRU 201, the second RRU 202, and the power supply apparatus 300 are disposed side by side, the third component is disposed above or below the any two components, where the three components are all seamlessly installed between each other; or, after any two of the first RRU 201, the second RRU 202, and the power supply apparatus 300 are disposed in a cascading manner, the third component is disposed on a side of the any two components, where the three components are all seamlessly installed between each other. Specifically, there is a diversity of structural relationships among the first RRU 201, the second RRU 202, and the power supply apparatus 300, which are not exhaustively listed herein. It should be noted that, a shorter distance between the first RRU 201 and the power supply apparatus 300 and a shorter distance between the second RRU 202 and the power supply apparatus 300 better reflect advantages of the present invention.

Besides, preferably, another electrical equipment may also be disposed on the first tower 400 in this embodiment, where the second end of the power supply apparatus 300 is also connected to the other electrical equipment and is configured to provide power for the another electrical equipment.

Figure 4:
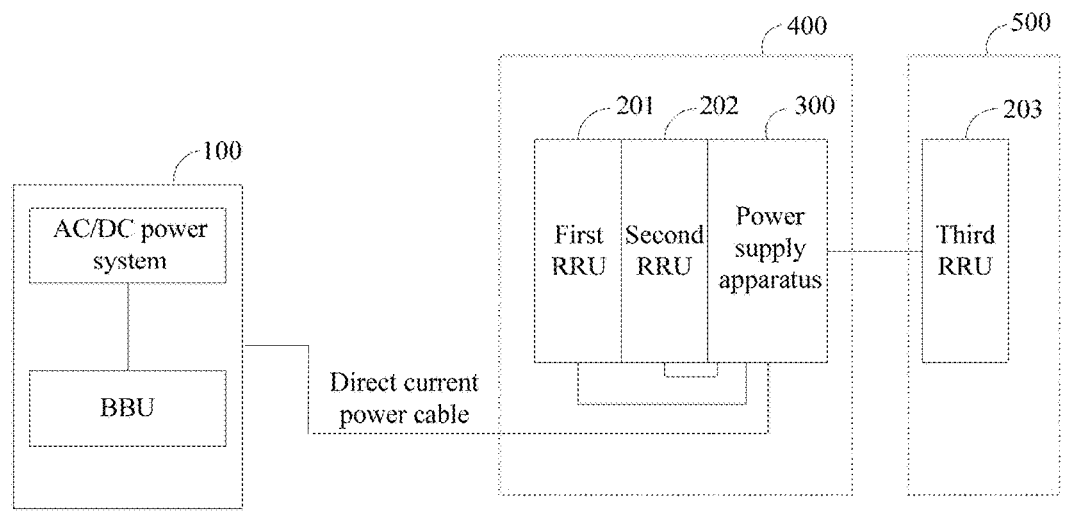
FIG. 4 is another schematic structural diagram of a distributed base station provided by the present invention.

On the basis of the foregoing embodiment, referring to FIG. 4, FIG. 4 shows another schematic structural diagram of a distributed base station provided by the present invention. In this embodiment, the distributed base station further includes a second tower 500, where a third RRU 203 is disposed on the second tower 500. The second end of the power supply apparatus 300 is connected to the third RRU 203 and is configured to provide power for the third RRU 203.

A distance between the third RRU 203 and the power supply apparatus 300 is less than a distance between the third RRU 203 and the power system 100.

In this embodiment, the power supply apparatus 300 disposed on the first tower 400 may be further connected to the third RRU 203 on the second tower 500, and is configured to provide power for the third RRU 203 on the second tower 500.

More preferably, the present invention may further include a BBU, and the power system 100 is further configured to output power to the BBU.

Figure 5:
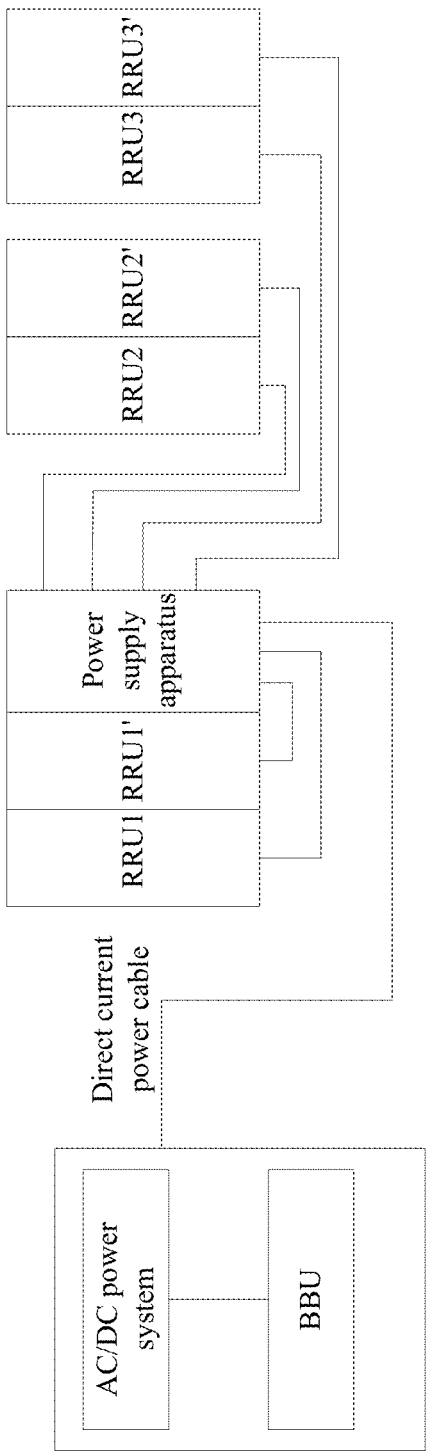
FIG. 5 is another schematic connection diagram of a distributed base station provided by the present invention.

Therefore, in the present invention, an RRU on another tower may be further connected to the power supply apparatus 300 on the first tower 400, further reducing a length of a direct current power cable that connects the RRU on the another tower to the power system 100, as shown in FIG. 5. In addition, when an RRU needs to be added on the another tower to expand a capacity of the base station, the newly added RRU may also be connected to the power supply apparatus 300 on the first tower 400, so that the power supply apparatus 300 provides power to the RRU on the another tower.

Figure 6:
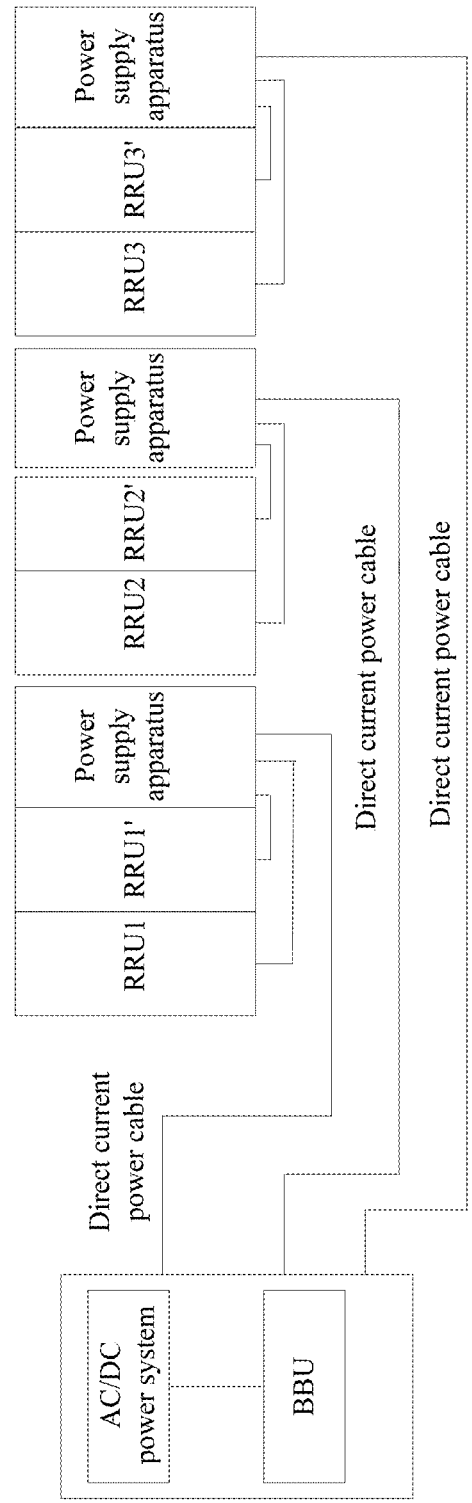
FIG. 6 is yet another schematic connection diagram of a distributed base station provided by the present invention.

According to the foregoing technical solutions of the present invention, the distributed base station provided by the present invention includes a power system 100 and at least two RRUs 200, where the two RRUs 200 may be a first RRU 201 and a second RRU 202, and further includes a power supply apparatus 300, where a first end of the power supply apparatus 300 is connected to the power system 100, a second end of the power supply apparatus 300 is connected to the first RRU 201 and the second RRU 202, and the power supply apparatus 300 is configured to receive power output by the power system 100 and provide the power to the first RRU 201 and the second RRU 202, where a distance between the first RRU 201 and the power supply apparatus 300 is less than a distance between the first RRU 201 and the power system 100, and a distance between the second RRU 202 and the power supply apparatus 300 is less than a distance between the second RRU 202 and the power system 100. Therefore, an RRU in the present invention is not directly connected to a power system, but is indirectly connected to the power system by using a power supply apparatus. In addition, when the RRU is connected to the power system by using the power supply apparatus, it is ensured that a distance between the RRU and the power supply apparatus is less than a distance between the RRU and the power system. Therefore, during capacity expansion of a base station, as shown in FIG. 6, when an RRU needs to be added, the newly added RRU only needs to be connected to a power supply apparatus, and a new direct current power cable does not need to be added between a power system and the power supply apparatus. In addition, because a distance between the newly added RRU and the power supply apparatus is less than a distance between the RRU and the power system, compared with the technical solution in the prior art that a direct current power cable must be synchronously added when an RRU is added, the present invention reduces a length of a direct current power cable and reduces engineering costs and late-stage protection costs during laying of direct current power cables.

Figure 7:
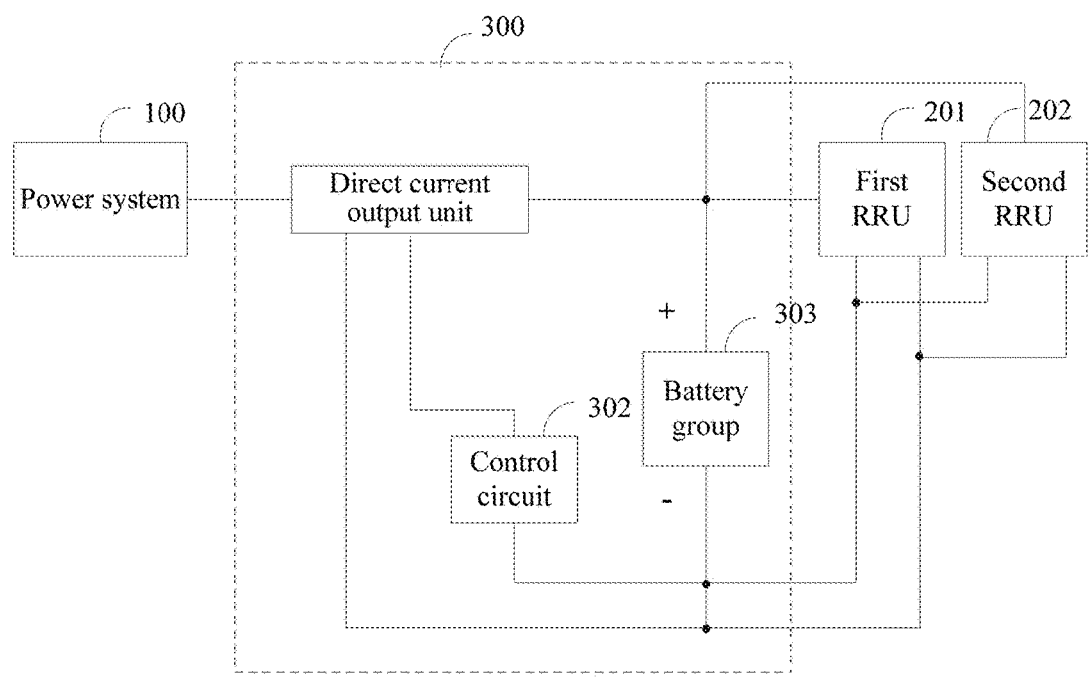
FIG. 7 is a schematic structural diagram of a power supply apparatus of a distributed base station provided by the present invention.

On the basis of the foregoing embodiment, referring to FIG. 7, FIG. 7 shows a schematic structural diagram of a power supply apparatus of a distributed base station provided by the present invention, including a direct current output unit 301, a control circuit 302, and a battery group 303, where an input end of the direct current output unit 301 is connected to the power system 100, a positive output end of the direct current output unit 301 is connected to positive input ends of the at least two RRUs 200, a negative output end of the direct current output unit 301 is connected to negative input ends of the at least two RRUs 200, and the direct current output unit 301 is configured to receive a voltage output by the power system 100, convert the voltage to a direct current voltage, and output the direct current voltage to the at least two RRUs 200;

a positive end of the battery group 303 is connected to the positive input ends of the at least two RRUs 200, and a negative end of the battery group 303 is connected to the negative input ends of the at least two RRUs 200; and a first end of the control circuit 302 is connected to a control end of the direct current output unit 301, a second end of the control circuit 302 is connected to control ends of the at least two RRUs 200, and a third end of the control circuit 302 is connected to a control end of the battery group 303.

Specifically, in this embodiment, the control circuit 302 is configured to: when an output power of the direct current output unit 301 is equal to or greater than a power required by the at least two RRUs 200, control the direct current output unit 301 to output power to the at least two RRUs 200, and only when the output power of the direct current output unit 301 is greater than the power required by the at least two RRUs 200, control the direct current output unit 301 to charge the battery group 303; and when the output power of the direct current output unit 301 is less than the power required by the at least two RRUs 200, control the direct current output unit 301 and the battery group 303 to jointly output power to the at least two RRUs 200.

More specifically, implementation principles of the power supply apparatus 300 provided by the present invention are as follows:

When the power system 100 is in a normal working state, a power provided by the power system 100 is sufficient to provide a load power required by the at least two RRUs 200. In this case, the direct current output unit 301 directly outputs an output power of the power system 100 to the at least RRUs 200. In addition, the direct current output unit 301 also charges the battery group 303. However, when the power system 100 is faulty, the output power of the power system 100 decreases gradually. When the output power of the direct current output unit 301 is less than the load power required by the at least two RRUs 200, the battery group 303 automatically starts, and outputs power together with the direct current output unit 301 to the at least two RRUs 200.

In this embodiment, preferably, the battery group 303 includes at least one battery, where the battery may be a lithium battery, a lead acid battery, or a fuel battery.

Figure 8:
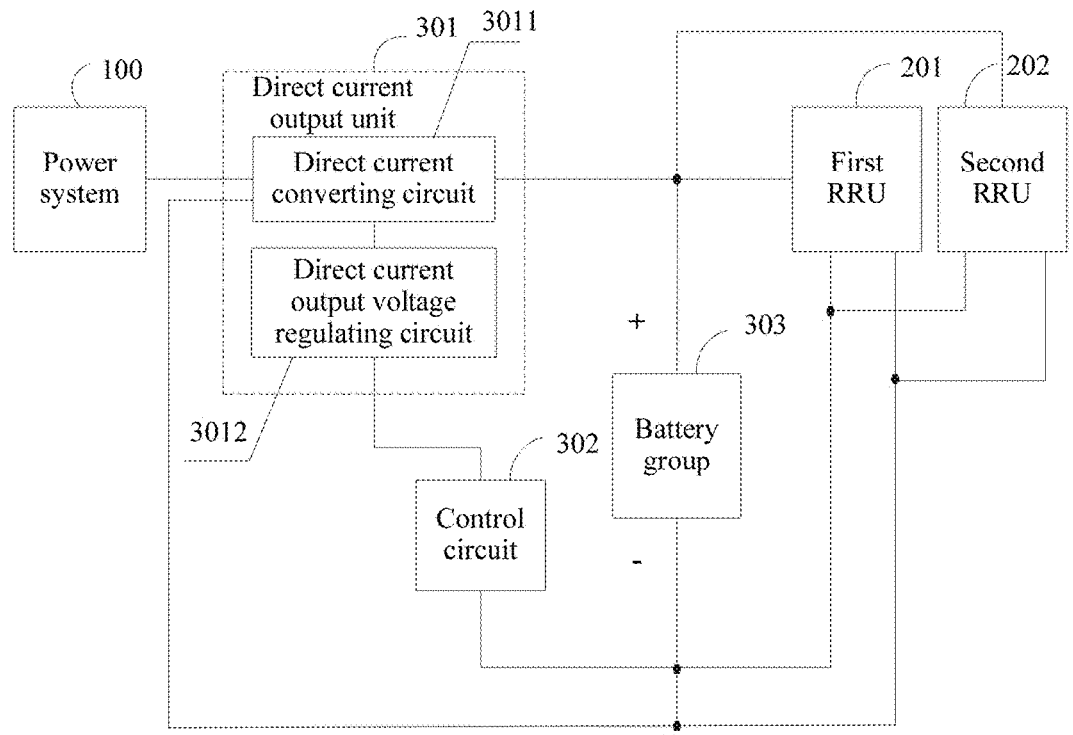
FIG. 8 is another schematic structural diagram of a power supply apparatus of a distributed base station provided by the present invention.

In an actual application process, an input voltage of the at least two RRUs 200 must be a rated direct current voltage. Based on this, the direct current output unit 301 in the present invention may further include a direct current converting circuit 3011 and a direct current output voltage regulating circuit 3012, as shown in FIG. 8.

A first input end of the direct current converting circuit 3011 is connected to the power system 100, a second input end is connected to one end of the direct current output voltage regulating circuit 3012, a third input end is connected to the negative input ends of the at least two RRUs 200, and a first output end of the direct current converting circuit 3011 is connected to the positive input ends of the at least two RRUs 200. In the present invention, the first input end of the direct current converting circuit 3011 is connected to the power system 100, to convert a voltage input by the power system 100, so that the converted voltage output by the direct current output unit 301 to the at least two RRUs 200 meets an input voltage condition of the RRUs 200. Preferably, the direct current converting circuit 3011 may include an alternating current-direct current AC/DC converting circuit and a direct current-direct current DC/DC converting circuit. Therefore, the present invention does not restrict the connected power system 100, which enhances the applicability of the system.

Another end of the direct current output voltage regulating circuit 3012 is connected to the control circuit 302.

The direct current output voltage regulating circuit 3012 is configured to receive a control instruction sent by the control circuit 302, and regulate an output voltage of the direct current output unit 301 according to the control instruction.

In this embodiment, when the direct current output unit 301 and the battery group 303 simultaneously output power to the RRUs 200, the control circuit 302 automatically regulates an output power of the direct current output unit 301 according to a current load power required by the RRUs 200 and an output power of the battery group 303, so as to control an input power of the direct current output unit 301 to ensure that a voltage drop of a direct current power cable meets a voltage drop requirement for long-distance remote deployment of a direct current power cable. Specifically, the control circuit 302 sends a control instruction for controlling and regulating the output power of the direct current output unit 301, and the direct current output voltage regulating circuit 120 of the direct current output unit 301 receives the control instruction and further regulates the output power of the direct current output unit 301 according to the control instruction.

In the foregoing embodiment, the direct current output unit 301, the battery group 303, and the at least two RRUs 200 are always in a connected state. Therefore, when the direct current output unit 301 has no power output in a period of time, only the battery group 303 supplies power to the RRUs 200. After the battery group 303 supplies power to the RRUs 200 for a period of time, power of the battery group 303 gradually reduces until loss occurs. In this case, if the battery group 303 is not disconnected from the at least two RRUs 200, the power of the battery group 303 continues to lose, which undoubtedly affects a service life of the battery group 303 seriously.

Figure 9:
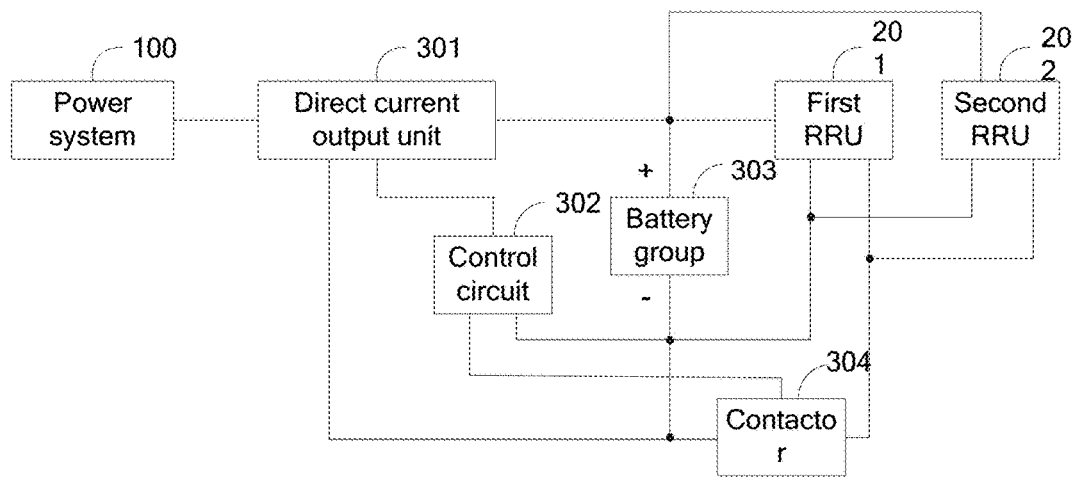
FIG. 9 is another schematic structural diagram of a power supply apparatus of a distributed base station provided by the present invention.

Based on this, in this embodiment, referring to FIG. 9, FIG. 9 shows yet another schematic structural diagram of a power supply apparatus of a distributed base station provided by the present invention, which further includes a contactor 304.

A first end of the contactor 304 is connected to a negative end of the battery group 303, a second end of the contactor 304 is connected to the negative input ends of the at least two RRUs 200, and the control circuit 302 is connected to a third end of the contactor 304.

Specifically, the control circuit 302 is further configured to: when the output power of the direct current output unit 301 is greater than 0, control the contactor 304 to close; and when the direct current output unit 301 has no power output and the output voltage of the battery group 303 is equal to a termination voltage of the battery group 303, control the contactor 304 to disconnect.

In this embodiment, when the direct current output unit 301 has a power output, the control circuit 302 controls the contactor 304 to close. In this case, the control circuit includes three loops, which are a first loop formed by the direct current output unit 301, the at least two RRUs 200, and the contactor 304, a second loop formed by the battery group 303, the at least two RRUs 200, and the contactor 304, and a third loop formed by the direct current output unit 301 and the battery group 303.

When the output power of the direct current output unit 301 is sufficient to provide the load power required by the at least two RRUs 200, the direct current output unit 301 directly provides the required load power for the at least two RRUs 200, and also charges the battery group 303. However, if the output power of the direct current output unit 301 is insufficient to provide the load power required by the at least two RRUs 200, the direct current output unit 301 and the battery group 303 jointly provide the required load power for the at least two RRUs 200.

When an input power of the direct current output unit 301 cannot meet a voltage drop requirement for long-distance remote deployment of a direct current power cable, the output power of the direct current output unit 301 is 0, that is, the direct current output unit 301 has no power output. In this case, only the battery group 303 continues to provide the required load power for the at least two RRUs 200. When an output voltage of the battery group 303 is equal to the termination voltage of the battery group 303, the control circuit 302 controls the contactor 304 to disconnect. That is, the first loop formed by the direct current output unit 301, the at least two RRUs 200, and the contactor 304, and the second loop formed by the battery group 303, the at least two RRUs 200, and the contactor 304 are disconnected.

Therefore, in the present invention, when the output voltage of the battery group 303 is equal to the termination voltage of the battery group 303, the contactor 304 is used to disconnect a connection between the battery group 303 and the at least two RRUs 200, which avoids a severe power loss of the battery group 303 resulted from continuous discharging, thereby guaranteeing a service life of the battery group 303.

Figure 10:
FIG. 10 is a schematic structural diagram of a communications system provided by the present invention.

In addition, the present invention further provides a communications system. As shown in FIG. 10, the communications system includes an external power supply and the foregoing distributed base station, where the external power supply is configured to supply power to the distributed base station.

It should be noted that the embodiments in this specification are all described in a progressive manner, each embodiment focuses on a difference from other embodiments, and for same or similar parts in the embodiments, reference may be made to these embodiments.

Finally, it should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

Detailed above are a distributed base station and a communications system under the present invention. In this specification, specific examples are used to describe the principle and implementation manners of the present invention, and the description of the embodiments is only intended to help understand the method and core idea of the present invention. Meanwhile, a person of ordinary skill in the art may, based on the idea of the present invention, make modifications with respect to the specific implementation manners and the application scope. Therefore, the content of this specification shall not be construed as a limitation to the present invention.

What is claimed is:

1. A distributed base station, comprising:
   a power system;
   at least two radio remote units (RRUs), comprising a first RRU and a second RRU;
   a power supply apparatus having a first end connected to the power system and having a second end connected to the first RRU and the second RRU, wherein the power supply apparatus is configured to receive power output by the power system and provide power for the first RRU and the second RRU;
   wherein the first RRU and the power supply apparatus are separated by a first distance, the first RRU and the power system are separated by a second distance, the second RRU and the power supply apparatus are separated by a third distance, and the second RRU and the power system are separated by a fourth distance; and
   wherein the first distance is less than the second distance, and the third distance is less than the fourth distance.

2. The distributed base station according to claim 1, wherein the first RRU, the second RRU and the power supply apparatus are all disposed on a first tower.

3. The distributed base station according to claim 2, wherein
   the first RRU is in contact with the second RRU, and the first RRU is in contact with the power supply apparatus; or
   the second RRU is in contact with the first RRU, and the second RRU is in contact with the power supply apparatus; or
   the power supply apparatus is in contact with the first RRU, or the power supply apparatus is in contact with the second RRU.

4. The distributed base station according to claim 2, wherein other electrical equipment is disposed on the first tower, the second end of the power supply apparatus is connected to the other electrical equipment, and the power supply apparatus is configured to provide power for the other electrical equipment.

5. The distributed base station according to claim 2, further comprising:
a second tower having a third RRU disposed thereon, and wherein the second end of the power supply apparatus is connected to the third RRU and the power supply apparatus is configured to provide power for the third RRU; and
wherein the third RRU and the power supply apparatus are separated by a fifth distance and the third RRU and the power system are separated by a sixth distance;
wherein the fifth distance is less than the sixth distance.

6. The distributed base station according to claim 1, further comprising a baseband unit (BBU), and wherein the power system is further configured to output power to the BBU.

7. The distributed base station according to claim 1, wherein:
the power supply apparatus comprises a direct current output unit, a control circuit, and a battery group;
an input end of the direct current output unit is connected to the power system, a positive output end of the direct current output unit is connected to positive input ends of the at least two RRUs, a negative output end of the direct current output unit is connected to negative input ends of the at least two RRUs, and the direct current output unit is configured to receive a voltage output by the power system, convert the voltage to a direct current voltage, and output the direct current voltage to the at least two RRUs;
a positive end of the battery group is connected to the positive input ends of the at least two RRUs, and a negative end of the battery group is connected to the negative input ends of the at least two RRUs;
a first end of the control circuit is connected to a control end of the direct current output unit, a second end of the control circuit is connected to control ends of the at least two RRUs, and a third end of the control circuit is connected to a control end of the battery group; and
the control circuit is configured to:
when an output power of the direct current output unit is equal to or greater than a power required by the at least two RRUs, control the direct current output unit to output power to the at least two RRUs,
only when the output power of the direct current output unit is greater than the power required by the at least two RRUs, control the direct current output unit to charge the battery group, and
when the output power of the direct current output unit is less than the power required by the at least two RRUs, control the direct current output unit and the battery group to jointly output power to the at least two RRUs.

8. A communications system, comprising:
an external power supply; and
a distributed base station, wherein the external power supply is configured to supply power to the distributed base station, wherein the distributed base station comprises:
a power system;
at least two radio remote units (RRUs), comprising a first RRU and a second RRU;
a power supply apparatus having a first end connected to the power system and having a second end connected to the first RRU and the second RRU, wherein the power supply apparatus is configured to receive power output by the power system and provide power for the first RRU and the second RRU;
wherein the first RRU and the power supply apparatus are separated by a first distance, the first RRU and the power system are separated by a second distance, the second RRU and the power supply apparatus are separated by a third distance, and the second RRU and the power system are separated by a fourth distance; and
wherein the first distance is less than the second distance, and the third distance is less than the fourth distance.

9. The communications system according to claim 8, wherein the first RRU, the second RRU and the power supply apparatus are all disposed on a first tower.

10. The communications system according to claim 9, wherein
the first RRU is in contact with the second RRU, and the first RRU is in contact with the power supply apparatus; or
the second RRU is in contact with the first RRU, and the second RRU is in contact with the power supply apparatus; or
the power supply apparatus is in contact with the first RRU, or the power supply apparatus is in contact with the second RRU.

11. The communications system according to claim 9, wherein other electrical equipment is disposed on the first tower, the second end of the power supply apparatus is connected to the other electrical equipment, and the power supply apparatus is configured to provide power for the other electrical equipment.

12. The communications system according to claim 9, further comprising:
a second tower having a third RRU disposed thereon, and wherein the second end of the power supply apparatus is connected to the third RRU and the power supply apparatus is configured to provide power for the third RRU;
wherein the third RRU and the power supply apparatus are separated by a fifth distance and the third RRU and the power system are separated by a sixth; and
wherein the fifth distance is less than the sixth distance.

13. The communications system according to claim 8, further comprising a baseband unit (BBU), and wherein the power system is further configured to output power to the BBU.

14. The distributed base station according to claim 8, wherein:
the power supply apparatus comprises a direct current output unit, a control circuit, and a battery group;
an input end of the direct current output unit is connected to the power system, a positive output end of the direct current output unit is connected to positive input ends of the at least two RRUs, a negative output end of the direct current output unit is connected to negative input ends of the at least two RRUs, and the direct current output unit is configured to receive a voltage output by the power system, convert the voltage to a direct current voltage, and output the direct current voltage to the at least two RRUs;
a positive end of the battery group is connected to the positive input ends of the at least two RRUs, and a negative end of the battery group is connected to the negative input ends of the at least two RRUs;

a first end of the control circuit is connected to a control end of the direct current output unit, a second end of the control circuit is connected to control ends of the at least two RRUs, and a third end of the control circuit is connected to a control end of the battery group; and the control circuit is configured to:
- when an output power of the direct current output unit is equal to or greater than a power required by the at least two RRUs, control the direct current output unit to output power to the at least two RRUs,
- only when the output power of the direct current output unit is greater than the power required by the at least two RRUs, control the direct current output unit to charge the battery group, and
- when the output power of the direct current output unit is less than the power required by the at least two RRUs, control the direct current output unit and the battery group to jointly output power to the at least two RRUs.

* * * * *